3,329,725
HIGH VISCOSITY POLYFORMALS

Henry F. Lederle, North Haven, Conn., assignor to Olin Mathieson Chemical Corporation, a corporation of Virginia
No Drawing. Filed Oct. 4, 1963, Ser. No. 313,749
4 Claims. (Cl. 260—609)

This invention relates to a method for preparing high viscosity polyformals in which cyclohexanedimethanol is reacted with an aldehyde, such as paraformaldehyde and an alkylene glycol. More specifically, this invention relates to the preparation of lubricants of a high viscosity useful in central power system fluids as well as for general hydraulic fluid applications.

Heretofore, it was necessary to add excess paraformaldehyde to the polyformal compositions known in the art to achieve the high viscosity required for lubricants used as central power fluids, viz., a kinematic viscosity of about 2,000 to 3,000 cs. at 100° F. With polyformals prepared from diethylene glycol and dipropylene glycol it is difficult to obtain products which exhibit viscosities higher than 250 cs. at 100° F. During the course of the reaction an appreciable amount of this excess paraformaldehyde sublimes from the reaction mixture and subsequently recondenses upon the condensers, unduly prolonging the reaction times.

Central hydraulic systems have been developed which use the same fluid for the actuating of power steering, transmission, starting motor, operating the hydropneumatic suspension, brakes, seat actuators, windshield wipers, and window regulators, etc. A major requirement of such a fluid is that it must possess a low ASTM slope (the fluid must exhibit a high viscosity index and must be effective throughout a 500° F. range). The fluid must exhibit inertness towards metals and sealing compositions and must possess good shear stability, good lubricity, and a high degree of oxidative stability in the presence of metals. The most rigorous requirement is viscosity, however, since the fluid must perform as an automatic transmission fluid at high temperatures, and yet it must meet the low-temperature requirements of a brake fluid. No adequate synthetic central systems fluid has heretofore been devised. Hydraulic fluids, in general, consist of three essential components, viz., lubricants, solvents, and additives. A large number of suitable solvents and additives are commercially available. The lubricant portion comprises approximately 20% of the weight of a central power system fluid. It should be emphasized, however, that the valuable polyformals prepared by the process of this invention are useful in a wide variety of hydraulic fluids other than in central power system fluids.

In the method of this invention cyclohexanedimethanol:

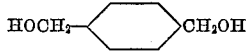

is reacted with an aldehyde such as paraformaldehyde and an alkylene glycol to yield high viscosity polyformals.

The alkylene glycols that can be used include those of the formulae:

(1)  HO—R—OH (2) 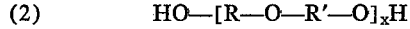 HO—[R—O—R'—O]$_x$H where R and R' are branched or straight-chain hydrocarbons of either the same or of different numbers of carbon atoms, said number of carbon atoms being greater than one and smaller than twelve.

Triethylene glycols and thiodiethylene glycols of the same type as previously mentioned are useful.

A mixture of glycols such as a mixture of diethylene glycol and dipropylene glycol gives a superior product. Others include triethylene glycol, 1,4-butane diol, 1,5-pentane diol, 2-methyl-2-ethyl-1,3-propanediol, 2-ethyl-2-butyl-1,3-propanediol, 2,2-diethyl-1,3-propanediol.

In general, the desired viscosity ranges are obtained when the quantity of cyclohexanedimethanol used comprises less than a moiety of all the reactants. However, there is no restriction upon the amount that can be used. It is noted that the viscosity becomes disproportionately high as the relative amount of cyclohexanedimethanol is increased.

The amount of formaldehyde that can be added ranges from 1.5 to 3.5 moles of formaldehyde per 2 moles of glycol. The preferred relative amount is 2.00 to 2.75 moles of formaldehyde per 2 moles of glycol. Formaldehyde and paraformaldehyde are of equivalent efficacy in the practice of this invention.

The temperature of reaction ranges from approximately 50 to 200° C. Although reactions at atmospheric pressure are convenient, pressures of reaction can be varied from subatmospheric to plus five atmospheres or more. The length of time required for the reaction can vary from 2 to 24 hours; the preferred range is 3 to 8 hours.

Illustrative experimental preparations include:

EXAMPLE I

A one liter, three-necked flask was charged with 2.0 moles of glycol consisting of 87.5 mole percent diethylene glycol and 12.5 mole percent of cyclohexanedimethanol, 2.4 moles of 91% paraformaldehyde, 200 ml. of benzene and 2 ml. of boron trifluoride-ethyl ether complex. The flask was equipped with a thermometer, an azeotrope trap with a condenser, and a stirrer. Heating was commenced and continued for four hours during which time about 48 to 50 ml. of water had collected in the azeotrope trap. At the end of the four-hour heating period the rate of recovery of water in the azeotrope trap had become negligible. An aqueous lime suspension consisting of 40 ml. of a solution containing 10% lime was then added, and the product was stripped, first to 115° C. at atmospheric pressure, and then to 160° C. at water aspirator pressure in order to remove the benzene. The resulting mixture was filtered yielding the polyformal product in almost quantitative yield. The kinematic viscosity at 100° F. was 1968 cs. and at 210° F. it was 216 cs. (ASTM slope, 0.37). The molecular weight of the polyformal product was 3520.

EXAMPLE II

A mixture of 75.0 mole percent diethylene glycol and 25.0 mole percent of cyclohexanedimethanol (total, 2 moles) was charged into a one liter, three-necked flask along with 2.4 moles of 91% paraformaldehyde, 200 ml. of benzene, and 2 ml. of boron trifluoride-ethyl ether complex. The same procedure as in Example I was followed. The polyformal product exhibited a kinematic viscosity at 100° F. of 3241 cs. and at 210° F., a kinematic viscosity of 301 cs. The ASTM slope was 0.38 and the molecular weight of the product was 5040.

EXAMPLE III

A mixture of 50.0 mole percent diethylene glycol and 50.0 mole percent cyclohexanedimethanol (2 moles) was charged into a three-necked flask with 2.4 moles of 91% paraformaldehyde, 200 ml. of benzene and 2 ml. of boron trifluoride-ethyl ether complex. The same apparatus and procedure used and followed in Example I was again utilized. The kinematic viscosity of the polyformal product at 100 F. was 6200 cs. and that at 210° F. was 373 cs. The ASTM slope was 0.42 and the molecular weight of the polyformal was 6510.

EXAMPLE IV

A mixture of 95 mole percent of diethylene glycol and 5 mole percent of cyclohexanedimethanol were introduced into a one liter, three-necked flask with 2.4 moles of 91% paraformaldehyde, 200 ml. of benzene, and 2 ml. of boron trifluoride-ethyl ether complex. The flask was equipped with a thermometer, azeotrope trap with a condenser, and a stirrer. Azeotroping and condensing were commenced and continued for four hours. The catalyst was then neutralized with an aqueous lime solution. After the reaction mixture had been filtered, a quantitative yield of the polyformal product remained. The kinematic viscosity at 100° F. was 1638 cs. and at 210° F. it was 198 cs. (ASTM slope, 0.37).

EXAMPLE V

A one liter three-necked flask was charged with a mixture of 25 mole percent of cyclohexanedimethanol and 75 mole percent of thiodiethylene glycol, 120 mole percent paraformaldehyde, 200 ml. of benzene and 2 ml. of boron trifluoride-ethyl ether complex. The flask was equipped with a thermometer, an azeotrope trap with a condenser, and a stirrer. Heating was continued for 4 hours during which time approximately 48 to 50 ml. of water had been collected in the azeotrope trap. At the end of the four-hour heating period the rate of recovery of water in the azeotrope trap had become negligible. An aqueous lime suspension consisting of 40 ml. of a solution containing 10% lime was then added, and the product was stripped, first to 115° C. at atmosphere pressure, and then to 160° C. at water aspirator pressure in order to remove the benzene. The resulting mixture was filtered yielding the polyformal product in almost quantitative yield. The kinematic viscosity at 100° F. was 4253 cs., and at 210° F. it was 311 cs. The ASTM slope was 0.42 and the molecular weight was 3840.

What is claimed is:

1. A high viscosity polyformal prepared by reacting cyclohexanedimethanol and at least one other glycol selected from the group consisting of diethylene glycol, triethylene glycol, dipropylene glycol, 1,4-butanediol, 1,5-pentanediol, 2-methyl - 2-ethyl - 1,3 - propanediol, 2-ethyl - 2 - butyl - 1,3 - propanediol, 2,2-diethyl - 1,3-propanediol, thiodiethylene glycol and mixtures thereof, with paraformaldehyde at a temperature of from 50 to 200° C. with removal of water from the reaction mixture and in the presence of boron trifluoride-ethyl ether catalyst, about 0.75 to about 1.75 moles of paraformaldehyde being added for each mole of glycol employed.

2. The polyformal of claim 1 in which the other glycol is diethylene glycol.

3. The polyformal of claim 1 in which the other glycol is thiodiethylene glycol.

4. The polyformal of claim 1 in which the other glycol is dipropylene glycol.

References Cited

UNITED STATES PATENTS

| | | | |
|---|---|---|---|
| 2,786,081 | 3/1957 | Kress | 260—615 |
| 2,968,646 | 1/1961 | Caldwell et al. | 260—611 XR |
| 3,068,294 | 12/1962 | Rosen et al. | 260—611 |

LEON ZITVER, *Primary Examiner.*

BERNARD HELFIN, *Examiner.*